United States Patent
Rahn et al.

(10) Patent No.: US 11,743,047 B2
(45) Date of Patent: Aug. 29, 2023

(54) CRYPTOGRAPHICALLY IDENTIFYING A DEVICE

(71) Applicant: Arista Networks, Inc., Santa Clara, CA (US)

(72) Inventors: Ethan Barnett Rahn, Agoura Hills, CA (US); Andrey Elenskiy, Oakland, CA (US); Steven Cohen, San Francisco, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 89 days.

(21) Appl. No.: 17/018,983

(22) Filed: Sep. 11, 2020

(65) Prior Publication Data

US 2022/0086001 A1 Mar. 17, 2022

(51) Int. Cl.
*H04L 9/32* (2006.01)
*H04L 9/08* (2006.01)
*H04L 9/30* (2006.01)

(52) U.S. Cl.
CPC .......... *H04L 9/3213* (2013.01); *H04L 9/0825* (2013.01); *H04L 9/30* (2013.01); *H04L 9/3268* (2013.01)

(58) Field of Classification Search
None
See application file for complete search history.

(56) References Cited

U.S. PATENT DOCUMENTS

| | | | |
|---|---|---|---|
| 9,774,452 B2* | 9/2017 | Bjarnason | H04L 9/3247 |
| 10,447,683 B1* | 10/2019 | Loladia | H04W 12/71 |
| 2018/0219857 A1* | 8/2018 | Bhattacharya | H04L 63/0807 |
| 2019/0042708 A1* | 2/2019 | Pala | H04L 9/3268 |
| 2019/0306673 A1* | 10/2019 | Sharaga | H04L 12/1403 |
| 2019/0394042 A1* | 12/2019 | Peddada | H04L 9/0894 |
| 2020/0059881 A1* | 2/2020 | Gupta | H04L 63/0807 |
| 2020/0162268 A1* | 5/2020 | Wentz | H04L 9/50 |
| 2020/0177589 A1* | 6/2020 | Mangalvedkar | G06F 16/245 |
| 2020/0195445 A1* | 6/2020 | Zhang | H04L 9/3247 |
| 2021/0099288 A1* | 4/2021 | Soriano | H04L 9/0894 |
| 2021/0336966 A1* | 10/2021 | Gujarathi | H04L 9/3213 |
| 2021/0350021 A1* | 11/2021 | Wang | H04L 9/3247 |
| 2022/0052849 A1* | 2/2022 | Kasso | H04L 9/0825 |

* cited by examiner

*Primary Examiner* — Michael W Chao
*Assistant Examiner* — Shadi H Kobrosli
(74) *Attorney, Agent, or Firm* — Fountainhead Law Group P.C.

(57) ABSTRACT

Cryptographically identifying a device to a service includes: providing the cloud service with a cryptographically signed token, the token being embedded in the device when the device was manufactured, the token including first information and second information. The cloud service verifies the token using a public key associated with the second information and determines a user using the first information. The device receives, from the cloud service, provisioning information customized for the user and including a client certificate for communicating with the cloud service.

18 Claims, 6 Drawing Sheets

210-1 TOKEN

220-1 START TIME 230-1 END TIME 250-1 KEY IDENTIFIER 260-1 SYSTEM IDENTIFIER

---

210-2 TOKEN

{
    "nbf" : 1597806000   ∼ 220-2
    "exp" : 4753479600   ∼ 230-2
  +   "kID" : 2c180b335211ec4a   ∼ 250-2
  +   "systemID" : SSJ12345678   ∼ 260-2
}

FIG. 2

CRYPTOGRAPHICALLY IDENTIFYING A DEVICE

BACKGROUND

Networking devices may be operated in conjunction with a service. Internet of things (IoT) devices, for example, send telemetry data over a network to a service which may perform real-time analytics. When powered up for the first time, networking devices may be enrolled in the service. User-intervention is typically required to identify the networking device to the service for enrollment. A user may type in a serial number or scan a barcode, Quick Response (QR) code, or other code on a machine-readable optical label.

In addition, it may be advantageous to securely authenticate the network device. Generally, a secure cryptoprocessor, such as a Trusted Platform Module (TPM), would be included in the networking device to store cryptographic keys, generate cryptographic keys, and the like. However, adding a secure cryptoprocessor to the networking device incurs the cost of the secure cryptoprocessor for operations that may only be performed once at enrollment.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 2 illustrates example tokens.

DETAILED DESCRIPTION

Overview

The present disclosure describes systems and techniques for secure authentication of a networking device during enrollment with a service without using a secure cryptoprocessor, manually entering a serial number, or manually scanning a code. In the interest of Zero Touch Provisioning, the present disclosure—once plugged in and connected to the internet—automatically begins enrolling the networking device in the service. Although a signed token is used to prevent unauthorized access, a trusted platform module (TPM) in the networking device is not needed to produce it. In addition, embodiments of the present technology may be readily added to existing systems without a TPM, because new hardware (e.g., a TPM) is not introduced.

Instead, during manufacturing a cryptographically signed token may be generated by a secure server and stored in the networking device's read-only memory (ROM). The cryptographic signing prevents spoofing of a token (because it can be detected) and hence unauthorized enrollment in the service. The token may be a JavaScript Object Notation (JSON) Web Token (JWT) and include the networking device's serial number (or other unique device identifier). The token may also include other information, such as an identifier for the private key used to sign the token. When the networking device is purchased, its serial number may be scanned and tied to the customer in an orders database. Subsequently, the customer powers on the device and connects it to the internet.

Upon first power up, the networking device may contact the service and securely provide the token. The service may retrieve a public key corresponding to the name/number of the private key used to sign the token, authenticate the token, and cross reference the serial number to determine to which customer the device belongs. After the token is authenticated, the networking device can be provisioned by the service, according to services and specifications for the customer. Although the present disclosure is made with reference to networking devices such as network switches and associated services, the present technology is broadly applicable to any IoT device and cloud service.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

System Architecture

Figure 1:
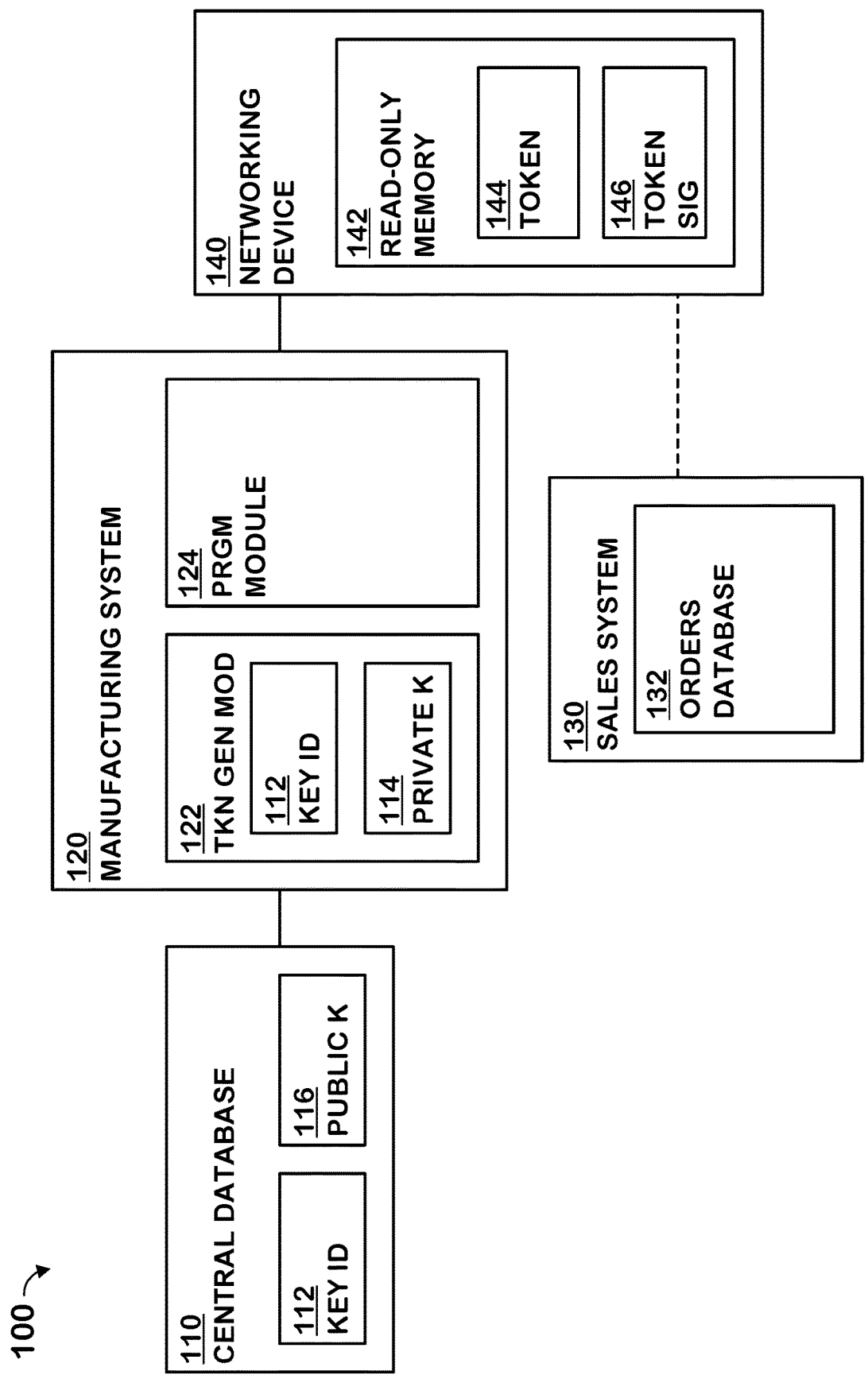
FIG. 1 illustrates an example system block diagram.

FIG. 1 illustrates example system 100 according to some embodiments. System 100 may be used for manufacturing and selling a networking device. System 100 may comprise central database 110, manufacturing system 120, sales system 130, and networking device 140. Central Database 110 may store sets of key identifications 112 and public keys 116. Each key identification 112 may have a corresponding private key 114 and public key 116.

Manufacturing system 120 may include token generating module 122 and programming module 124. Token generating module 122 generates token 144 and token signature 146, which are stored in read-only memory 142 on networking device 140, for example, during the manufacturing process. For example, token generating module 122 may use key identification 112 and private key 114 to generate token 144 and sign the token (e.g., produce token signature 146). Token 144 may uniquely identify networking device 140 to a service. Sales system 130 may be a system for selling products and services (e.g., taking orders, fulfilling orders, etc.). Sales system 130 includes orders database 132 which may store customer order information.

FIG. 2 illustrates tokens 210-1 and 210-2, according to some embodiments. Tokens 210-1 and 210-2 are examples of token 144. Tokens may include token information, such as start time 220-1, end time 230-1, key identifier 250-1, and system identifier 260-1. Start time 220-1 may specify a date and time at which token 210-1 becomes valid/effective. In other words, a date and time before which the token is invalid (e.g., should not be accepted for processing). Typically, start time 220-1 may be set to the date and time of when the token is generated during manufacturing. Alternatively, start time 220-1 may be set to a time period after manufacturing. For example, the time period may be an expected shipping time or expected time in inventory/storage.

End time 230-1 may specify a date and time after which the token is invalid (e.g., when the token expires). Typically, end time 230-1 may be set so that the token is valid for the anticipated lifespan of the networking device. That way, the networking device can be re-enrolled in the service after an extended period off-line (e.g., days, weeks, or months), such as after an earthquake, flood, or other disaster. For example, end time 230-1 may be in a range from 5 years to 100 years (e.g., after the date and time the token was generated). By way of further non-limiting example, end time 230-1 may be in a range from 5 years to 100 years after a model or version of networking device 140 was released.

Key identifier 250-1 may specify a public key which may be used to authenticate a token signature. Key identifier 250-1 may specify key identification 112. For example, the token signature may be generated with private key 114 (corresponding to key identification 112) and the token verified with public key 116 (also corresponding to key identification 112).

System identifier 260-1 may uniquely identify networking device 140. For example, system identifier may be a serial number comprising alphanumeric characters. By way of further non-limiting example, system identifier 360-1 may be any number of character/bytes long, such as in a range from 8-characters/bytes to 128-characters/bytes long.

Token 210-2 shows a non-limiting example of a token. Token 210-2 may include human-readable text which stores and transmits data objects comprising attribute-value pairs. For example, token 210-2 may be a JavaScript Object Notation (JSON) Web Token (JWT). "nbf" field 220-2 specifies a start date and time for the token to be valid of 1597806000. 1597806000 is Wednesday, Aug. 19, 2020 3:00:00 AM GMT in Unix time. Unix time (also known as Unix epoch, POSIX time, and Unix timestamp) describes a point in time as the number of seconds that have elapsed since the Unix epoch on Jan. 1, 1970 at 00:00:00 UTC, minus leap seconds.

"exp" field 230-2 specifies a token expiration date and time of 4753479600. 4753479600 is Monday, Aug. 19, 2120 3:00:00 AM GMT in Unix time. "kID" field 250-1 specifies a key identifier of 2c180b335211ec4a. 2c180b335211ec4a is the first 16 bytes of a hash (SHA256) of the marshalled public key (key signature). "systemID" field 260-2 specifies a system identifier (e.g., serial number) of SSJ12345678.

Tokens may include additional or fewer token information. For example, key identifier 250-1 and 250-2 may be omitted. Here, unique identifier 260-1 and 260-2 may be used not only to identify the networking device and the purchaser of the networking device (as described below), but also the private key used to sign the token. Central database 110 may store unique identifier 260-1 and 260-2 as key identification 112. Unique identifier 260-1 and 260-2 may then be used to lookup public key 116.

Turning back to FIG. 1, token generating module 122 may further provide key identification 112 and public key 116 (which forms a public key and private key pair with private key 114) to central database 110. Programming module 124 may program (generated) token 144 and token signature 146 into read-only memory (ROM) 142. ROM 142 may be a non-volatile memory, such as an electrically erasable programmable read-only memory (EEPROM or E2PROM), flash memory, or the like.

ROM 142 may be configured in networking device 140 such that token 144 and token signature 146 may be written to ROM 142 by programming module 124 only and networking device 142 does not alter token 144 and token signature 146 stored in ROM 142. That way, token 142 and token signature 146 may still be available to re-enroll networking device 140 into the service after an extended period off-line, such as after a natural or man-made catastrophe.

After networking device 140 is manufactured, it may be stored in a warehouse until it is ordered by a customer. Once networking device 140 is sold to a customer, its unique system identifier may be recorded/stored along with the customer name in orders database 132. For example, prior to shipping networking device 140 to the customer, the system identifier may be scanned and associated with the customer's order (and hence the customer) in orders database 132. Here, the customer may be a single business entity or a subsidiary, division, group, or location/site of a business entity. Orders database 132 may include information for each order/sale, such as a customer, product, cost/price, sales order number, sales order line items, and the like.

Workflow for Preparing a Networking Device

Figure 3:
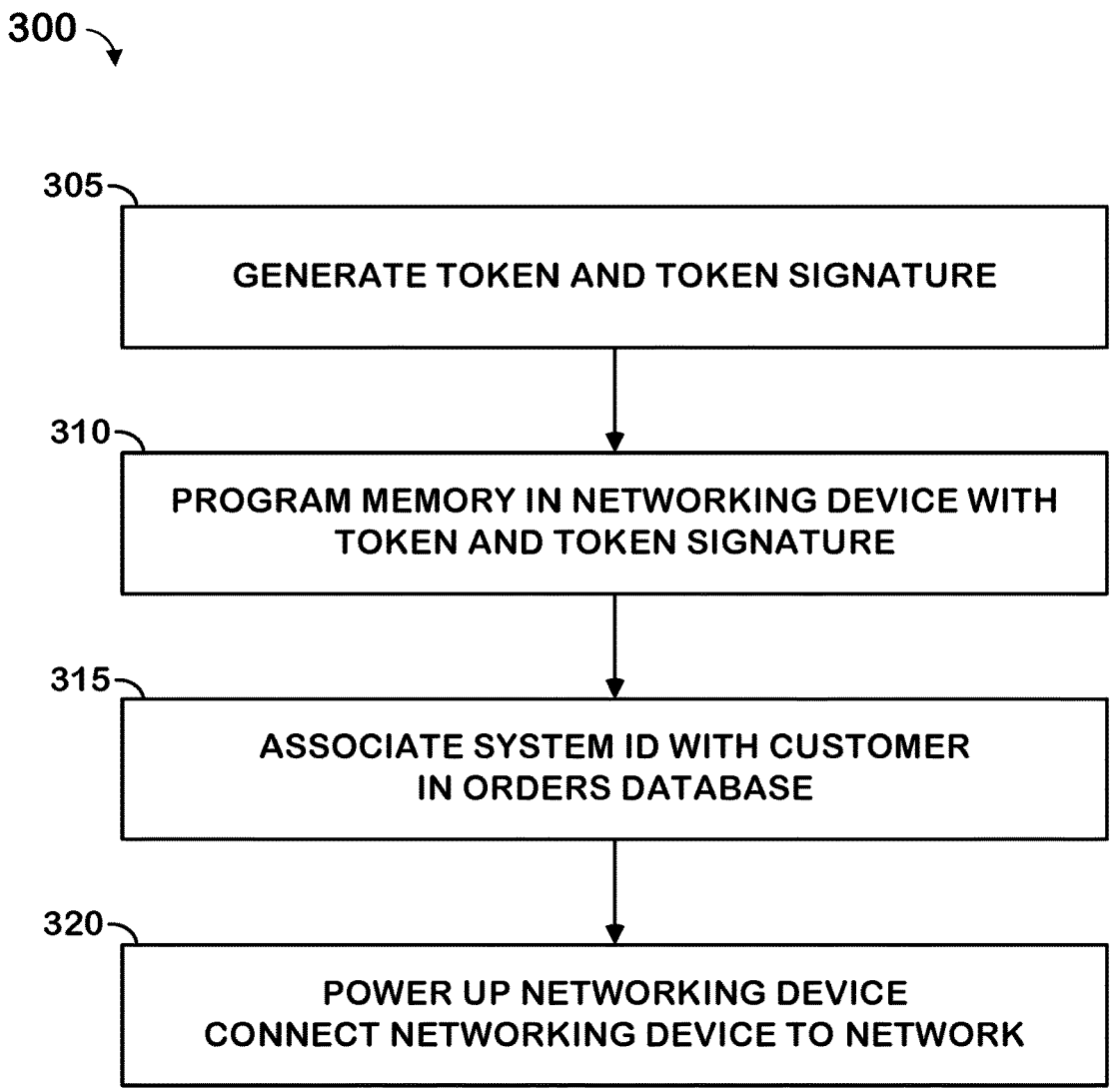
FIG. 3 illustrates a flow diagram of an example method for preparing a networking device using manufacturing and sales systems.

FIG. 3 illustrates workflow 300 for preparing a networking device for cryptographic identification. Workflow 300 may be performed by system 100. Workflow 300 may commence at step 305, where token generating module 122 may generate token 144 and token signature 146. For example, token generating module 122 may use key identification 112 and other token information to assemble token 144. Example tokens were provided in FIG. 2.

To generate token signature 146, token generating module 122 may sign (all or some) of the token information in token 144. In other words, cryptographic algorithms using a private key are applied to (all or some of) token 144 to generate token signature 146. Non-limiting examples of cryptographic algorithms that may be used to sign token 144 (e.g., include a signature generation algorithm) include elliptic-curve cryptography (e.g., Elliptic Curve Digital Signature Algorithm P-256 or other curve), Rivest-Shamir-Adleman (RSA), and the like.

At step 310, programming module 124 may write token 144 and token signature 146 to ROM 142. At step 315, sales system 130 stores the system identification along with the customer in orders database 132. For instance, the system identifier may be scanned and associated with the customer's order (and hence the customer) in orders database 132. At step 320, (administrators or technicians for) the customer unpacks networking device 140, connects networking device 140 to a network (e.g., the internet), and powers up networking device 140.

System Architecture II

Figure 4:
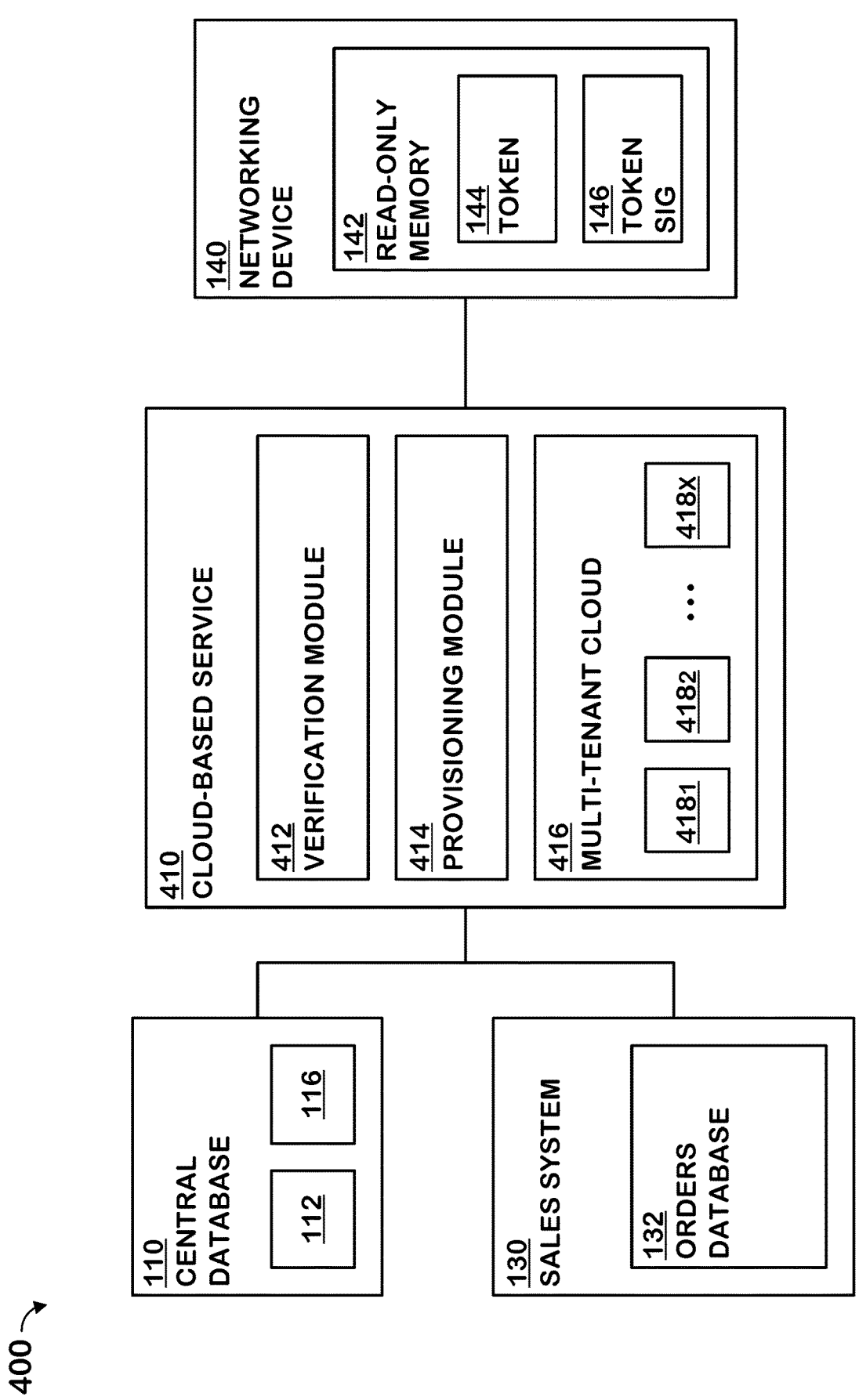
FIG. 4 illustrates another example system block diagram.

FIG. 4 depicts example system 400 for cryptographically identifying a system to a service. Central database 110, sales system 130, and networking device 140 were described above in relation to FIG. 1. Cloud-based service 410 may include servers, storage, databases, networking, software, analytics, and intelligence to provide a service over the Internet ("the cloud"). By way of non-limiting example, cloud-based service 410 may automate provisioning of, control of, monitoring of, and analysis of data from (multiple of) networking device 140. A further non-limiting example of cloud-based service 410 may be Arista Networks' CloudVision® network management framework.

Cloud-based service 410 may include verification module 412, provisioning module 414, and multi-tenant cloud 416.

Verification module 412 may verify token 144 stored in ROM 142. Verification module 412 may read key identifier 250-1 from the token (e.g., token 144, 210-1, and 210-2) to get key identification 112 corresponding to private key 114. Recall that token generating module 122 used private key 114 to generate token signature 146. Verification module 412 may use key identification 112 to request public key 116 from central database 110. Verification module 412 may use public key 116 and token signature 146 to authenticate token 144.

Provisioning module 414 may configure networking device 140. For example, provisioning module 414 may upload a bootstrap script to networking device 140. By way of further non-limiting example, the bootstrap script may be a Python (or other language) script run as the root user on networking device 140. The bootstrap script may cause networking device 140 to perform such operations as: update running image files, install additional applications, and generate a startup configuration file (startup-config). Image files are copies of the system software running on networking device 140. Updating an image file updates the system software. A startup configuration file typically configures the software on networking device 140 during system startup/reboot.

After the script finishes running, networking device 140 may reboot and use the startup configuration file (on this and subsequent reboots/startups). The bootstrap script may customize networking device 140 for the customer/user. For example, the bootstrap script may be customized to load the customer's preferred software image version, install the customer's applications, generate a startup configuration file according to the customer's preferences, and the like. The bootstrap script may also perform basic configuration to ensure networking device 140 is able to connect to cloud-based service 410.

In multi-tenant cloud 416, multiple customers may share computing resources. Multi-tenant cloud 416 includes tenants $418_1$-$418_x$. Each tenant's data is isolated and remains invisible to the other tenants. When networking device 140 enrolls in cloud-based service 410, it is important for networking device 140 to be in the right tenant (e.g., tenant controlled by the customer that owns/operates networking device 140).

Workflow for Cryptographically Identifying a Networking Device

Figure 5:
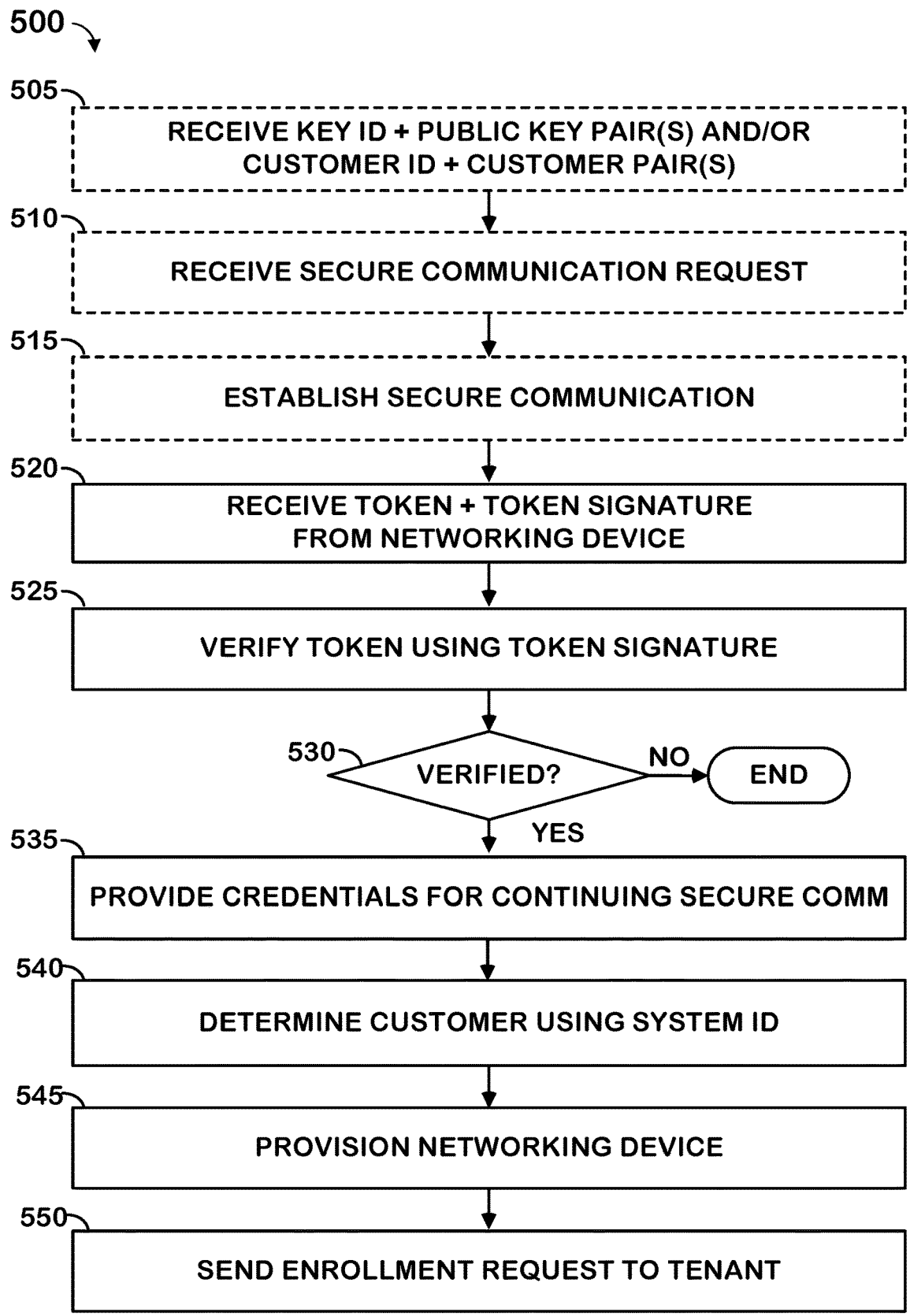
FIG. 5 illustrates a flow diagram of an example method for cryptographically identifying a device.

FIG. 5 depicts workflow 500 for cryptographically identifying a networking device. Workflow 500 may be performed by system 400. Workflow 500 may commence at step 505, where verification module 412 may optionally receive (a) a key identification and corresponding public key pairing(s) (from central database 110) and/or (b) customer identification and customer pairing(s) (from sales database 132). When verification module 412 does not receive some or all of this information at step 505, it may request needed information from central database 110 and/or sales database 132 (e.g., before step 530).

At step 510, cloud-based service 410 may optionally receive a secure communication request. For example, networking device 140 on startup (after step 320) may request to securely communicate, such as over Hypertext Transfer Protocol Secure (HTTPS), with cloud-based service 410. At step 515, cloud-based service 410 may establish a secure connection (e.g., over HTTPS) with networking device 140.

At step 520, cloud-based service 410 may receive token 144 and token signature 146 from networking device 140. Networking device 140 may send token 144 and token signature 146 to enroll in cloud-based service 410.

At step 525, verification module 412 verifies token 144 using token signature 146. Verification module 412 looks in key identifier 250-1 or 250-2 for key identification 112. If key identification 112—public key 116 pairings are stored in cloud-based service 410, then verification module 412 retrieves public key 116 corresponding to key identification 112. Otherwise, authentication module can send key identification 112 to central database to request corresponding public key 116.

Verification module 412 may apply a signature verification algorithm to token 144 using public key 116 and token signature 146. The signature verification algorithm receives token 144, public key 116, and token signature 146, and verifies token 144 (e.g., token 144 has not been changed since it was signed). Non-limiting examples of cryptographic algorithms that may be used to verify token 144 (e.g., include a signature verification algorithm) include elliptic-curve cryptography (e.g., Elliptic Curve Digital Signature Algorithm P-256 or other curve), Rivest-Shamir-Adleman (RSA), and the like.

At step 530 when token 144 is invalid, method 500 ends, and networking device 140 does not enroll in cloud-based service 410. Typically, when token 144 fails verification, (administrators/technicians for) the customer will troubleshoot, retry, and the like to enroll networking device 140 in cloud-based service 410. When token 144 is valid, method 500 proceeds to step 535.

Note that token 144 and token signature 146 are used to identify networking device 140 to cloud-based service 410 in a cryptographically secure manner. Although token 144 is not encrypted—it may be in human-readable text—it is cryptographically signed using asymmetric cryptography. In other words, token signature 146 prevents token 144 from being altered or spoofed, because any changes to token 144 will cause step 530 to fail. Without private key 114, a spoofed token cannot be validly signed. For example, token signatures prevent an unauthorized party from spoofing a token in order to enroll their (potentially stolen or gray market) networking device in someone else's (e.g., a competitor's) tenant and steal information. By way of further example, token signatures prevent a malicious party from using a computing system (e.g., notebook computer) from impersonating a networking device to gain access to someone else's tenant.

At step 535, cloud-based service 410 sends credentials for secure communications to networking device 140. Authentication module uses token 144 and token signature 146 to identify networking device 140 in a trusted manner. For ongoing, secure communications between cloud-based service 410 and networking device 140, cloud-based service 140 provides different credentials. The credentials may include a client certificate, such as a public key certificate. A public key certificate is an electronic document used to prove the ownership of a public (encryption) key. The certificate includes information about the key, information about the identity of its owner (called the subject), and the digital signature of an entity that has verified the certificate's contents (called the issuer). Typically, the public key may be used to communicate with the certificate's subject, when the issuer is trusted and the signature is valid. For example, the credential (client certificate) may be an x509 public key certificate.

At step 540, cloud-based service 410 looks in system identifier 260-1 or 260-2 for system identification. If system identification—customer pairs are stored in cloud-based service 410, then cloud-based service 410 retrieves the customer corresponding to the system identification. Otherwise, cloud-based service 410 can send the system identification to orders database 132 to request/lookup the customer.

At step 545, provisioning module 414 provisions networking device 140. For example, provisioning module 414 may upload a bootstrap script to networking device 140. The uploaded script may be customized for the customer identified at step 540. For example, running the script may upgrade the system software on networking device 140 to a distribution and/or to a particular version selected/approved by the customer. By way of further non-liming example, provisioning module 414 may configure networking device 140 to ensure networking device 140 is able to connect to cloud-based service 410.

At step 550, cloud-based service 410 sends an enrollment request to an appropriate one of tenants $418_1$-$418_x$. For example, each customer has its own tenant. With the customer associated with networking device 140 determined, cloud-based service identifies that customer's tenant and sends a request for networking device 140 to enroll to that customer's tenant. The request may include the system identification. The tenant may grant or deny the request, perform additional checks of networking device 140, and the like.

Networking Device

Figure 6:
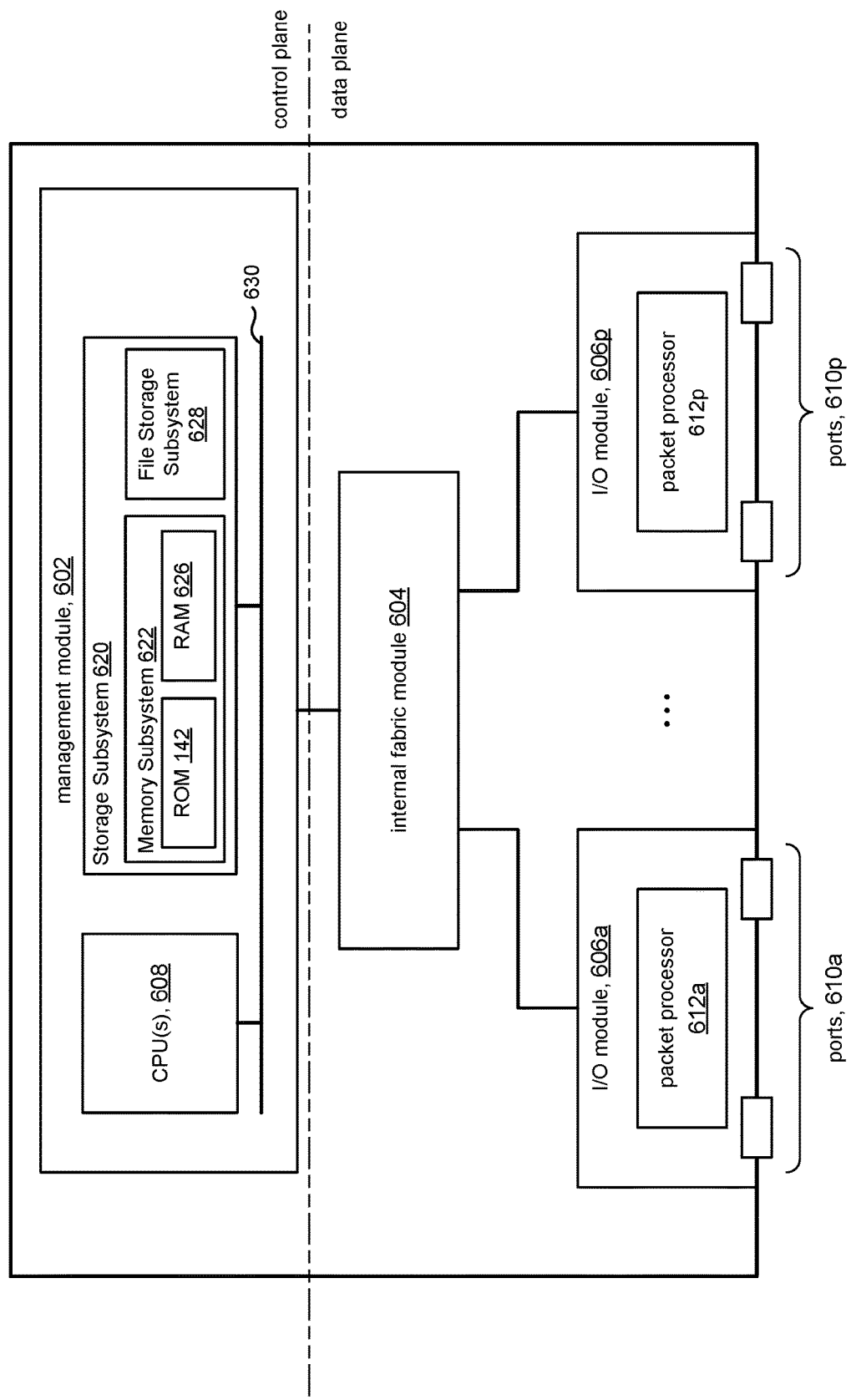
FIG. 6 shows an illustrative example of a networking device that can be adapted in accordance with the present disclosure.

FIG. 6 depicts an example of networking device 140 in accordance with some embodiments of the present disclosure. In some embodiments, networking device 140 can be a switch. As shown, networking device 140 includes a management module 602, an internal fabric module 604, and a number of I/O modules 606a-606p. Management module 602 includes the control plane (also referred to as control layer or simply the CPU) of networking device 140 and can include one or more management CPUs 608 for managing and controlling operation of networking device 140 in accordance with the present disclosure. Each management CPU 608 can be a general-purpose processor, such as an Intel®/AMD® x86 or ARM® microprocessor, that operates under the control of software stored in a memory, such as random-access memory (RAM) 626. Control plane refers to all the functions and processes that determine which path to use, such a routing protocols, spanning tree, and the like.

Internal fabric module 604 and I/O modules 606a-606p collectively represent the data plane of networking device 140 (also referred to as data layer, forwarding plane, etc.). Internal fabric module 604 is configured to interconnect the various other modules of networking device 140. Each I/O module 606a-606p includes one or more input/output ports 610a-610p that are used by networking device 140 to send and receive network packets. Input/output ports 610a-610p are also known as ingress/egress ports. Each I/O module 606a-606p can also include a packet processor 612a-612p. Each packet processor 612a-612p can comprise a forwarding hardware component (e.g., application specific integrated circuit (ASIC), field programmable array (FPGA), digital processing unit, graphics coprocessors, content-addressable memory, and the like) configured to make wire speed decisions on how to handle incoming (ingress) and outgoing (egress) network packets. In accordance with some embodiments some aspects of the present disclosure can be performed wholly within the data plane.

Management module 602 includes one or more management CPUs 608 that communicate with storage subsystem 620 via bus subsystem 630. Other subsystems, such as a network interface subsystem (not shown in FIG. 1), may be on bus subsystem 630. Storage subsystem 620 includes memory subsystem 622 and file/disk storage subsystem 628 represent non-transitory computer-readable storage media that can store program code and/or data, which when executed by one or more management CPUs 608, can cause one or more management CPUs 608 to perform operations in accordance with embodiments of the present disclosure.

Memory subsystem 622 includes a number of memories including main RAM 626 for storage of instructions and data during program execution and read-only memory (ROM) 132 in which fixed instructions and data (e.g., token 144 and token 146) are stored. File storage subsystem 628 can provide persistent (i.e., non-volatile) storage for program and data files, and can include a magnetic or solid-state hard disk drive, and/or other types of storage media known in the art.

One or more management CPUs 608 can run a network operating system stored in storage subsystem 620. A network operating system is a specialized operating system for networking device 140 (e.g., a router, switch, firewall, and the like). For example, the network operating system may be Arista Extensible Operating System (EOS®), which is a fully programmable and highly modular, Linux-based network operating system. Other network operating systems may be used.

Bus subsystem 630 can provide a mechanism for letting the various components and subsystems of management module 602 communicate with each other as intended. Although bus subsystem 630 is shown schematically as a single bus, alternative embodiments of the bus subsystem can utilize multiple busses.

What is claimed is:

1. A method for cryptographically identifying a device to a cloud service, the method comprising:
providing, to the cloud service, a token and a signature of the token, the token being embedded in the device, the token including a serial number and an identifier of a public key, wherein the cloud service verifies the token by decrypting the signature of the token with a public key retrieved using the identifier, determines a user based on the serial number, identifies a tenant of a multi-tenant cloud based on the user, and sends a request to enroll the device in the identified tenant, wherein the signature of the token is generated at the time of manufacture by encrypting the token using a private key component of a public key/private key pair, wherein the public key retrieved using the identifier is a public key component of the public key/private key pair;
receiving, from the cloud service, provisioning information customized for the user and including a client certificate for communicating with the cloud service.

2. The method of claim 1 wherein the token is valid for at least five years.

3. The method of claim 1 wherein the client certificate is a public key certificate.

4. The method of claim 1 wherein the multi-tenant cloud comprises computing resources shared by a plurality of tenants and data of each tenant of the plurality of tenants is isolated from other tenants of the plurality of tenants.

5. A system comprising:
a processor;
a read-only memory (ROM) communicatively coupled to the processor, the ROM storing a token and a signature of the token, the token including a serial number and an identifier of a public key; and a memory communicatively coupled to the processor, the memory storing instructions executable by the processor to:
  read the token from the ROM;
  provide the token to a cloud service, wherein the cloud service verifies the token by decrypting the signature of the token with a public key retrieved using the identifier, determines a user based on the serial number, identifies a tenant of a multi-tenant cloud based on the user, and sends a request to enroll the device in the identified tenant, wherein the signature of the token is generated at the time of manufacture by encrypting the token using a private key component of a public key/private key pair, wherein the public key retrieved using the identifier is a public key component of the public key/private key pair; and
  receive, from the cloud service, provisioning information, the provisioning information being customized for the user and including a client certificate for communicating with the cloud service.

6. The system of claim 5 wherein the token includes expiration information.

7. The system of claim 5 wherein the token is a JavaScript Object Notation (JSON) Web Token (JWT).

8. The system of claim 5 wherein the ROM is at least one of an electrically erasable programmable read-only memory and a flash memory.

9. The system of claim 5 wherein the provisioning information further includes an application selected by the user for installation on the system.

10. The system of claim 5 wherein the multi-tenant cloud comprises computing resources shared by a plurality of tenants and data of each tenant of the plurality of tenants is isolated from other tenants of the plurality of tenants.

11. A non-transitory computer-readable storage medium having embodied thereon a program, the program being executable by a processor to perform a method for cryptographically identifying a device to a cloud service, the method comprising:
  providing, to a cloud service using an encrypted channel, a token and a signature of the token, the token being embedded in the device, the token including a serial number and an identifier of a public key, wherein the cloud service verifies the token by decrypting the signature of the token with a public key retrieved using the identifier, determines a user based on the serial number, identifies a tenant of a multi-tenant cloud based on the user, and sends a request to enroll the device in the identified tenant, wherein the signature of the token is generated at the time of manufacture by encrypting the token using a private key component of a public key/private key pair, wherein the public key retrieved using the identifier is a public key component of the public key/private key pair; and
  receiving, from the cloud service responsive to the providing, provisioning information, the provisioning information being customized for the user and including a client certificate for secure communications with the cloud service.

12. The non-transitory computer-readable storage medium of claim 11 wherein the token includes human-readable text.

13. The non-transitory computer-readable storage medium of claim 11 wherein the token includes a date and time at which the cryptographically signed token becomes valid.

14. The non-transitory computer-readable storage medium of claim 11 wherein the user is determined based on the serial number in a sales system.

15. The non-transitory computer-readable storage medium of claim 11 wherein the provisioning information includes a software update for the device, the software update being at least one of a software distribution and a software version selected by the customer.

16. The non-transitory computer-readable storage medium of claim 11 wherein the encrypted channel uses Hypertext Transfer Protocol Secure (HTTPS).

17. The non-transitory computer-readable storage medium of claim 11 wherein the client certificate is an x509 public key certificate.

18. The non-transitory computer-readable storage medium of claim 11 wherein the multi-tenant cloud comprises computing resources shared by a plurality of tenants and data of each tenant of the plurality of tenants is isolated from other tenants of the plurality of tenants.

* * * * *